United States Patent [19]

Lee et al.

[11]  4,083,768
[45]  Apr. 11, 1978

[54] PREPARATION OF HIGH PERFORMANCE POLYELECTROLYTE MEMBRANE

[75] Inventors: Lester T. C. Lee, Parsippany; Kang-Jen Liu, Somerville, both of N.J.

[73] Assignee: Allied Chemical Corporation, Morris Township, N.J.

[21] Appl. No.: 689,304

[22] Filed: May 24, 1976

[51] Int. Cl.$^2$ ............................................. C25B 13/08
[52] U.S. Cl. .................................................. 204/296
[58] Field of Search ......................................... 204/296

[56] References Cited

U.S. PATENT DOCUMENTS

| 3,388,080 | 6/1968 | de Korosy et al. | 204/296 X |
| 3,562,139 | 2/1971 | Leitz | 204/296 |
| 3,868,314 | 2/1975 | Mizutani et al. | 204/296 |
| 3,887,499 | 6/1975 | Hodgdon | 204/296 X |

Primary Examiner—F.C. Edmundson
Attorney, Agent, or Firm—Arthur J. Plantamura

[57] ABSTRACT

Novel polyelectrolyte membranes of substantially improved efficiency and durability are prepared from a preswollen film containing a relatively high amount of an insoluble cross-linked aromatic polymer. By preswelling the insoluble matrix under controlled conditions preferably to an equilibrium stage, the dissociable ion-exchange groups may be introduced more uniformly onto the aromatic nuclei of the matrix to a desired depth of the film. Controlled penetration of functional groups is important in preparing high performance cationic, anionic membranes as well as bipolar membranes. The membranes so prepared have low electrical resistance, improved current efficiency, undergo negligible degradation and with excellent durability.

7 Claims, No Drawings

PREPARATION OF HIGH PERFORMANCE POLYELECTROLYTE MEMBRANE

CROSS-REFERENCE TO RELATED APPLICATIONS

The subject matter of this application relates to subject matter disclosed in U.S. Pat. Application of G. J. Dege and K.-J. Liu Ser. No. 645,848, entitled "Single Film, High Performance Bipolar Membrane" filed on Dec. 31, 1975 now U.S. Pat. No. 4,024,043 and in U.S. Patent Application of L. T. C. Lee, G. J. Dege and K.-J. Liu Ser. No. 689,305 filed on May 24, 1976 entitled "High Performance, Quality Controlled Bipolar Membrane."

BACKGROUND OF THE INVENTION

The present invention relates to the preparation of polyelectrolyte membranes carrying charged groups possessing low electrical resistance, superior performance properties and durability. More particularly, the invention relates to a novel method for the production of polyelectrolyte membranes comprising an organic polymer matrix intimately containing a substantial amount of a cross-linked aromatic polymer, and having dissociable functional groups chemically bonded to the aromatic nuclei and to the improved product obtained thereby.

Various ion exchange membranes such as cationic, anionic and bipolar are well known in the art. Styrene-divinylbenzene copolymers with sulfonic acid ion exchange groups (cationic type) are fully disclosed, e.g. in U.S. Pat. No. 2,731,411. The anion-type, for example, a styrene-divinylbenzene vinylpyridine membrane is disclosed in U.S. Pat. No. 2,860,097. Bi-polar membranes based on polyethylene-styrene copolymers are also known, e.g. U.S. Pat. Nos. 3,372,101, 3,388,080 and 3,562,139. Such membranes generally have the disadvantage of relatively high electrical resistance and low current efficiency. Heretofore, in accordance with teachings of the prior art it has been extremely difficult to obtain polyelectrolyte membranes with a relatively high number of cross-linking bonds, high functional group concentrations and yet have low electrical resistance and long operational capabilities. The present invention discloses a novel method to obtain a product with these advantages.

SUMMARY OF THE INVENTION

The primary object of the invention is to prepare the polyelectrolyte membranes carrying the charged groups which comprise a matrix of a polymeric film in intimate dispersed relationship with a relatively high amount of an aromatic polymer which is highly three dimensional cross-linked. The dissociable ion exchange groups are uniformly introduced on the aromatic nuclei by treating the polymeric matrix film with a suitable swelling agent, i.e. is in a preswollen state, which renders the nuclei sites uniformly receptive to functionalization. The matrix so treated and functionalized results in a membrane which is particularly advantageous and durable, has low electrical resistance and possesses high current efficiency. The properties resulting from preswelling are highly desirable for preparing the cationic, anionic and bipolar membranes for electrodialysis processes.

Another object is to prepare thicker and more densely structured polyelectrolyte membranes carrying the negatively and/or positively charged groups, wherein counter-ion transport in opposition to Donnan exclusion forces is greatly decreased, but nevertheless does permit sufficient hydraulic permeability to prevent the membrane from dehydrating.

A further object is to prepare highly cross-linked membranes carrying the charged groups which are less prone to blister, are tighter, i.e. substantially less porous, and permit only negligible salt diffusion across them.

Still another object of the invention is to prepare membranes which are less brittle, have little or no degradation occurring, which have excellent strength and durability, and which are stable under a wider range of conditions and for long periods of time.

Additional objects will become apparent from the disclosure which follows.

The cationic, anionic and bipolar membranes composition of the invention possess substantially improved performance characteristics and excellent strength and durability, not heretofore available. Such membranes perform exceptionally when used in electrodialysis. The membrane substrate or base film is composed of a polyolefin substrate film, such as polyethylene, polypropylene, etc. The matrix on which the functional groups are appended, is formed by chemically bonding on the substrate film at least 15% based on the total weight of a monovinyl aromatic polymer, such as polystyrene, polymethylstyrene, polyvinylnaphthalene, etc., which is cross-linked to the polyolefin substrate with a suitable polyvinyl aromatic cross-linking compound such as divinylbenzene or its equivalent. This relatively highly cross-linked, dense matrix is preswelled with a suitable preswelling agent, e.g. an organic solvent, before the ion-exchange groups are introduced on the aromatic nuclei. The conditions and procedures used in the present invention to obtain membranes which have improved performance in electrodialysis operations and which possess excellent strength and durability are set forth below in the ensuing description and examples.

DETAILED DESCRIPTION OF THE INVENTION

The polyelectrolyte membranes of the present invention are prepared from a cross-linked polyolefin-monovinyl aromatic single film matrix. Before appending the dissociable ionic groups, the cross-linked matrix is preswollen to render the matrix uniformly more readily receptive to react with functional groups. The resulting functionalized membranes possess lower resistance and higher performance. For the cationic membrane, the current efficiency in KOH (0.1N to 1.0N) of the membranes obtained employing the process of the invention is 99%, with an electrical resistance of 0.11 to 0.55 ohm-cm$^2$ in 0.1N H$_2$SO$_4$. For the anionic membrane, the current efficiency in HCl of membrane obtained according to the process of the invention is about 82% with an electrical resistance of 0.88 ohm-cm$^2$ in 1.0 NKF. The bipolar membranes prepared according to the invention and used in acid and base generation have an ion selectivity above 80% in an electrolyte medium of about one mole, and an initial voltage potential drop of 0.90 to 1.20 volts at current density of 109 ma/cm$^2$.

In preparing the high performance polyelectrolyte membranes carrying the charged groups according to the invention, the substrate is cross-linked sufficiently to prevent substantial dissolution or swelling of the resulting membrane when in solvents in which the membrane is to be primarily used, e.g., aqueous acid or base solutions. Accordingly, the initial polymeric film should be highly cross-linked, as much as 30% divinylbenzene on the weight basis of total styrene may be used to effect cross-linking. After build-up resulting film from the polymerization and cross-linking reaction, a matrix sheet comprising a three-dimensional cross-linked polystyrene-divinyl-benzene network is produced. The next step is to introduce the fixed ionic groups onto the matrix network. Since these highly cross-linked sheets are very tight and relatively highly nonabsorbent, a long functioning time is generally required for obtaining cationic, anionic or bipolar membranes with desired low resistance and good mechanical strength. A prolonged-functionalization treatment of this kind, however, usually results in the following adverse effects on the membrane precursor matrix:

i. Poor mechanical strength; weak and brittle.

ii. Inhomogenity across the membrane; over-reacted on the surface or insufficient in the middle.

iii. Degradation and darkening. Many extractable materials are formed.

iv. Nonuniformity in the interphase in the case of single-film bipolar membrane preparation wherein the percent of cationic section is very critical. Also the operation is time-consuming and substantially less economic.

In order to eliminate the undersirable side-effects resulted from the long or irregular functionalization treatment on a highly cross-linked polymeric film, a novel approach has been discovered wherein the matrix is subjected to a suitable preswelling step before appending the functional groups on the highly cross-linked matrix. The preswelling step solvates the highly cross-linked hydrocarbon chain with a suitable solvent (e.g., carbon tetrachloride, 1,2-dichloroethane) or solvent mixture until a desirable swollen state is reached. Thereafter functional groups from a functionalizing agent contained in a solvent (or solvent mixture) are introduced on the activated sites of the matrix. Since the base film of polystyrene/DVB cross-linked matrix in the swollen form has active sites solvated with solvent molecules, when the mixture containing functioning agent such as chlorosulfonic acid is introduced, the acid molecules are distributed rapidly and more evenly throughout the preswollen sheet. The sulfonation reaction is thus completed in a much shorter period with the negatively charged sulfonate groups much more uniformly distributed in the resulted membranes without the occurrence of appreciable side reactions.

In accordance with the process of the present invention, the matrix film is advantageously preswollen prior to being functionalized in a solvent or solvent mixture such as carbon tetrachloride, dichloroethane, etc., for a period of time sufficient to render the aromatic nuclei readily accessible to the reagent which contains the cation-exchange functional groups. The swelling solvent must be inert to the functionalizing groups or reagent but miscible with it or its mixture. As will be noted hereafter, and by way of examples, preswelling of the matrix film permits the functionalizing reaction to proceed under milder, more controlled conditions, with no significant degradation or embrittlement of the film. The sulfonation and chloroalkylation, amination are properly controlled and occur extensively on the aromatic groups yielding relatively high concentrations of ion exchange groups which minimizes salt leakage, due to Donnan exclusion forces and having low electrical resistance and low potential drop.

Preswelling of the cross-linked polyolefinic-polyaromatic matrix film, prior to the addition thereon of functional groups, may be affected by the use of a suitable solvent which partially dissolves at least one of the components of the cross-linked film. Illustrative solvents which may be employed, for example, are carbon tetrachloride, methylene chloride, chloroform, dichloroethylene, trichloroethylene, decalin, tetralin, tetrahydrofuran, dioxane, and dimethyl acetamide, which may be used either alone or as a co-solvent system comprising suitable ratios thereof. The solvent used is miscible to at least a substantial extent with the functionalizing solvent employed in adding functional groups to the final aromatic sites of matrix film. The preswelling of the matrix according to the invention is conducted for a suitable period of time which produces a substantial improvement in the rate and uniformity of functionalization. Preferably, the preswelling is maintained until the matrix approaches an equilibrium stage, a point after which there is no substantial additional dimensional change in the membrane matrix. At this point, the kinetics of functionalization, i.e. the rate of penetration of the functionalizing agent, approaches a constant. The periods of preswelling, it will be apparent, may vary over a fairly wide range, as can be seen, for example, from the times recorded in Table IV. In general, however, preswelling periods from about 15 minutes to about 48 hours are sufficient and preferable timed periods of from about 30 minutes to 30 hours, depending on the matrix composition, degree of cross-linking, thickness, etc. are adequate.

A preferred basic membrane composition in the present invention is that prepared from the polyethylene-polystyrene-divinylbenzene matrix which is hereinafter utilized as a typical composition in describing the preparation of membranes according to the invention.

General Procedure - In preparing the membrane the initial polyethylene film was first examined between crossed polaroid sheets for non-uniformities, such as gels, strains, disorientations or the like. The uniformity of the film's thickness was measured with a micrometer. The films were supported in glass or stainless steel troughs containing the styrenating mixture of the selected mole ratio of sytrene/divinylbenzene/benzoyl peroxide (catalyst), and at the desired temperature. Styrenation and cross-linking was conducted for a time period sufficient to attain equilibrium impregnation of the substrate film, which is dependent upon its thickness and morphology, as well as the styrenating temperature. In the subsequent procedure to functionalize the cross-linked matrix thus derived, the importance of using preswelling for cationic membrane preparation is experimentally demonstrated as shown in Table I. It is seen therein that the preswelling substantially improves the quality and performance of the membrane. The membrane prepared using preswelling has not only lower resistance, higher performance and superior physical properties, but also saves considerable time in sulfonation periods. A series of experiments were carried out on the same styrenated sheets. One film sample was preswelled prior to the sulfonation, while another sample was not. The two samples received the identical sulfonation treatment. The differences between the two sets of membranes in electric resistance are shown in Table II. The advantages resulting from use of the preswelling step in preparing the cationic membrane, are also essentially applicable to the preparation of the cationic section of a the bipolar membrane. When the film is treated with chlorosulfonating agents without proper preswelling, the final bipolar membrane obtained has high electrical resistance and is relatively ineffective for use in water splitting.

Prior to sulfonation, it is necessary if a product of superior quality is to be obtained that the cross-linked film be preswollen in a solvent, inert to, but at least partially miscible with the sulfonating agent or mixture

TABLE I
Comparison of Membranes Derived from Preswollen Cross-Linked Matrices vs. non-Preswollen Membranes

| Run No. | Material | DVB % | % Styrene | Pre-Swelling | Sulfonation Time | RH+ (ohm-cm$^2$) |
|---|---|---|---|---|---|---|
| 1 | 9 mil H.D.P.E. | 15 | 34 | yes | 35 min. | 204 |
| 2 | " | 15 | 34 | no | 35 min. | 666 |
| 3 | " | 15 | 34 | yes | 90 min. | 0.06 |
| 4 | " | 15 | 34 | no | 90 min. | 211 |
| 6 | 8 mil (Pottsville H.D.P.E. | 15.3 | 29 | yes | 1 hr. | 0.80 |
| 7 | " | 15.3 | 29 | no | 1 hr. | 599 |
| 8 | 10 mil ultra high mol. wt. P.E. | 15.3 | 32.7 | yes | 1½ hr. | 2.2 |
| 9 | " | 15.3 | 32.7 | no | 1½ hr. | 2,400 |

TABLE II
THE EFFECT OF PRESWELLING ON MEMBRANE MATRIX SULFONATION TIME, RESISTANCE, PERFORMANCE AND MECHANICAL STRENGTH OF MEMBRANE

| Thickness (mil) | Preswelling[1] Treatment | Sulfonation Time (hrs) | DVB % | Resistance H+ (ohm-cm$^2$) | K+ | (.1/1.0) KOH | Mechanical Appearance |
|---|---|---|---|---|---|---|---|
| 1.3 | no | 20.5 | 5.0 | .22 | 1.66 | 0.96 | Brittle; dark |
| 1.3 | yes | 1.0 | 5.0 | .22 | | 0.95 | Strong; yellow |
| 5.3 | no | 16.0 | 5.0 | .66 | | 0.85 | Brittle; dark |
| 5.3 | yes | 4.0 | 5.0 | .11 | | 0.87 | Strong; yellow |
| 2.0 | no | 20.5 | 5.0 | .22 | | | Very brittle |
| 2.0 | yes | 4.0 | 5.0 | .11 | | 0.84 | Strong; yellow (25 psi in |
| 9.0 | no | 20.5 | 5.0 | 1.55 | | | Brittle; brown |
| 9.0 | yes | 6.0 | 5.0 | .77 | | .97 | Strong; yellow |

[1]Preswelling treatment was done by immersing the cross-linked styrenated matrix in CCl$_4$ at room temperature for 8 hours or longer.

EXAMPLES 1 to 12

The following general procedures are employed to demonstrate the using of preswelling for preparing a series of membranes carrying the cation exchange groups. The results of cationic membranes are summarized in Table III. In preparing the membranes from the polyethylene films, the films were supported in a stainless steel trough containing the aromatic vinyl monomer mixture of the selected mole ratio of vinyl aromatic monomer and cross-linking agent, e.g. styrene/divinylbenzene/benzoyl peroxide (catalyst), and at the desired temperature. Immersion in the vinyl aromatic monomer, e.g. styrenation, is conducted for a time period necessary to attain sufficient impregnation of the film, which is dependent upon its thickness and morphology, as well as the styrenating temperature.

In impregnating the substrate film with the vinyl aromatic monomer, temperatures at or above which the film softens to an undesirable degree are to be avoided. Generally for mixtures containing 5–15% DVB, styrenations were carried out at 70°–85° C. for time periods of about ¼ to 1 hour. Following sytrenation, the film is removed from the bath, excess styrene removed from its surface, and it is then pressed between aluminum foil covered glass plates and polymerized at 70°–85° C. for 18–24 hours. In order to obtain styrene contents of about 40–60% the procedure may be repeated.

for about a suitable period of time, e.g. 24 hours. The solvent swells the film, making the aromatic nuclei more accessible for reaction; hence, the subsequent functionalization reaction rate is increased and the sulfonation will proceed faster and under milder conditions as shown in Tables I and II. The films suffer no apparent degradation, and yield membranes which are not embrittled and display much enhanced stability and durability. Chlorosulfonations may be run at room temperature with chlorosulfonic acidsolvent mixtures ranging from 10–100% chlorosulfonic acid. The chlorosulfonated film is hydrolyzed with dilute (0.2N) sulfuric acid for 24 hours at 45° C., then rinsed with distilled water until free of excess electrolyte. The membrane electrical resistance was measured with 1 KC, AC bridge at 0.1N H$_2$SO$_4$, and in the range of 0.11 to 0.77 ohm-cm$^2$. The current efficiency is measured in 0.1N KOH and 1.0N KOH solutions and showed from 0.89 to 100. In the electrodialysis for concentration of hydrogen fluoride solution, these cationic membranes can concentrate the HF solution from 14% up to 44% with an electrical resistance of 0.11 to 0.77 ohm-cm$^2$, whereas under the same conditions a commercial membrane, such as C-100*, can achieve only up to 30% concentration and with an electrical resistance of 1.2 ohm-cm$^2$. The membranes prepared according to the invention thus represent a substantially improved performance with significant savings in electrical energy.

*purchased from AMF, Inc.

TABLE III
High Performance Cationic Membranes Obtained From Preswelling Treatment

| Example No. | Material | Thickness (mil) | % Styrene | % DVB | Sulfonation Time (hrs) | RH+ (ohm-cm$^2$) | KOH (0.1 1.0N) | Dil | HF Con. Concentrated |
|---|---|---|---|---|---|---|---|---|---|
| 1 | HDPE | 5 | 16 | 5 | 2.5 | 0.22 | 1.00 | | |

TABLE III-continued
High Performance Cationic Membranes Obtained From Preswelling Treatment

| Example No. | Material | Thickness (mil) | % Styrene | % DVB | Sulfonation Time (hrs) | RH+ (ohm-cm$^2$) | KOH (0.1 1.0N) | Dil | HF Con. Concentrated |
|---|---|---|---|---|---|---|---|---|---|
| 2 | HDPE | 2 | 18 | 5 | 1.0 | 0.11 | 0.98 | | |
| 3 | HDPE | 2 | 25 | 2 | 1.0 | 0.22 | 0.89 | | |
| 4 | HDPE | 5 | 20 | 5 | 2.5 | 0.11 | 0.97 | | |
| 5 | HDPE | 2 | 20 | 2 | 1.0 | 0.22 | 0.96 | | |
| 6 | HDPE | 9 | 14 | 5 | 3.0 | 0.66 | 1.00 | | |
| 7 | HDPE | 9 | 20 | 5 | 3.0 | 0.44 | 0.99 | | |
| 8 | HDPE | 5 | 18 | 14 | 3.0 | 0.55 | 0.97 | | |
| 9 | HDPE | 4 | 34 | 30 | 2.5 | 0.22 | 1.00 | 14 | 41 |
| 10 | HDPE | 10 | 33 | 10 | 3.0 | 0.33 | 0.99 | 14 | 39 |
| 11 | UHPE | 15 | 33 | 10 | 3.5 | 0.22 | 1.00 | 14 | 41 |
| 12 | UHPE | 15 | 30 | 13 | 3.5 | 0.77 | 0.99 | 14 | 44 |

EXAMPLES 13-26

The following procedures were employed to demonstrate the using of preswelling in preparing bipolar membranes from the polyethylene films: The films were supported in a stainless steel trough containing the aromatic vinyl monomer mixture of the selected mole ratio of vinyl aromatic monomer and cross-linking agent, e.g. styrene/divinylbenzene/benzoyl peroxide (catalyst), and at the desired temperature. Immersion in the vinyl aromatic monomer, e.g. styrenation, is conducted for a time period necessary to attain sufficient impregnation of the film, which is dependent upon its thickness and morphology, as well as the styrenating temperature.

In impregnating the substrate film with the vinyl aromatic monomer, temperatures at or above the film softens to an undesirable degree are to be avoided. Generally for mixtures containing from about 5% to about 15% DVB, styrenations were carried out at 70°-85° C. for time periods of about ¼ to 1 hour. Following styrenation, the film is removed from the bath, excess styrene removed from its surface, and polymerized at 70°-85° C. for 18-24 hours. In order to obtain styrene contents in the range of about 40% to about 60% the procedure may be repeated. After each polymerization, surface polystyrene-DVB layer, i.e. the polystyrene which has not interspersed with the substrate is removed. Thereafter prior to sulfonation, the cross-linked film is preswollen in a solvent, inert to, but at least partially miscible with the sulfonating agent or mixture for about 24 hours. Chlorosulfonations may be run at room temperature with chlorosulfonic acid-solvent mixtures ranging from about 10% to about 100% chlorosulfonic acid. The preswelling organic solvents such as carbon tetrachloride, dichloroethane were commonly used. The preswelling time has significant effect on the rate of chlorosulfonation and subsequently, the percent of cationic section of the resulted bipolar membrane as shown in Table IV.

The reaction is started on one side of the film only and its progress through the film toward the opposite side is controlled and may be followed by microscopic examination of stained (methylene blue), microtomed, cross-sections. The interface between the reacted and unreacted layers is linear, parallel to the sides of the film and very sharp, attributed to both the homogeneity of the film and that the reaction is apparently diffusion-controlled. On the other hand, the film treated without preswelling, the interphase is irregular and non-uniform; in some worst cases, some sections were completely sulfonated while most sections still have high percent of unreacted areas. Extensive chlorosulfonation and chloromethylation pulse quaternization were observed by both chemical analysis and microscopic examination and indicates the concentrations of both functional groups in the final membrane are nearly equal.

TABLE IV
Effect of Pre-swelling on the Rate of Chlorosulfonation of Membrane Matrix*

| | | Pre-Swelling | | Chlorosulfonation | % | Electrical |
|---|---|---|---|---|---|---|
| No. | Agent | Time (hrs.) | Dimension Change | Time (Min.) | Cationic Section | Resistance (ohm-cm$^2$) |
| 1 | none | 0 | 0 | 280 | 30∫50 | 9,900 |
| 2 | CCl$_4$ | 1.0 | 2.1 | 280 | 55 | 5,900 |
| 3 | CCl$_4$ | 4.0 | 3.8 | 280 | 62 | 4,800 |
| 4 | CCl$_4$ | 8.0 | 4.3 | 280 | 75 | 3,300 |
| 5 | CCl$_4$ | 9.0 | 4.4 | 280 | 69 | 3,500 |
| 6 | CCl$_4$ | 12.0 | 4.9 | 280 | 81 | 1,400 |
| 7 | CCl$_4$ | 16.0 | 5.0 | 280 | 84 | 1,200 |
| 8 | CCl$_4$ | 18.0 | 5.0 | 280 | 84 | 1,100 |
| 9 | CCl$_4$ | 20.0 | 4.9 | 280 | 82 | 1,250 |
| 10 | ClCH$_2$CH$_2$Cl | 4.0 | 4.1 | 280 | 76 | 3,000 |
| 11 | ClCH$_2$CH$_2$Cl | 8.0 | 4.9 | 280 | 81 | 2,200 |
| 12 | ClCH$_2$CH$_2$Cl | 16.0 | 5.5 | 280 | 89 | 900 |

*The membrane matrix comprises a 10 mil thick ultra high molecular weight polyethylene containing 38.5% aromatic and cross-linked with 7.5% divinylbenzene.

In addition, it is observed from resistance measurements (1 kc, AC bridge) of sections removed at various time intervals from the sulfonated film, that the resistance is relatively high, ranging from 1000 to 10,000 ohm-cm$^2$ due to the remaining unfunctionalized layer, until just before the reaction reaches the opposite side, at which point it suddenly falls to very low values, indicating the membrane is wholly cation permeable as determined by microscope examination of stained thin sections. It is apparent that one skilled in the art may use any fraction of this time interval to locate the interface at any desirable position across the film's thickness. This also serves as an indication of the importance of the preswelling because of the sharp interface which may be produced on the film.

Once the partially chlorosulfonated film is hydrolized with dilute (1N) sulfuric acid, neutralized with a 0.1N KOH and 5% KCl mixture, rinsed free of excess electrolyte with distilled water, and dried, it is then ready for chloromethylation. In lieu of drying, the film may be treated with several portions of solvent such as carbon tetrachloride. The chloromethylation is conducted by immersing the films into chloromethylmethylether containing 2.5% by weight, $SnCl_4$, and refluxing (59° C.) for about 6 hours under nitrogen. The film is then removed and quaternized in a 25% solution of trimethylamine in acetone at 25° C., for about 20 hours. The single film bipolar membrane so obtained is equilibrated in 1N potassium fluoride at 25° C. for 48 hours, with stirring. Microtomed thin sections may be stained with either a cationic dye (methylene blue) and/or an anionic dye (methyl orange), and have been observed to compliment each other, with a sharp interface between them.

The performance of the resulted bipolar membrane is determined in the following manner. Electrical sensitivity - The voltage drop across the bipolar membrane is determined in a six-cell electrodialysis cell, containing platinum electrodes in each end compartment, across which a direct current may be applied from a D.C. power source (e.g. Hewlett-Packard Model No. 6289A). The bipolar membrane is mounted between the two center cells with its anion permeable side contacted with a 1N KOH electrolyte solution and facing the anode and its cation permeable side contacted with 1N HCl solution and facing the cathode. 1N KCl is used in the two adjacent cells, with 5% $K_2SO_4$ in the two end electrode compartments. Two Luggin tips (saturated KCl in agar-agar) are positioned in the center of the two middle cells, about 2 mm from the opposite faces of the bipolar membrane. The other ends of the Luggin tips are immersed in saturated KCl solutions containing two Calomel electrodes which are connected to a voltmeter.

The voltage drop across the 1N HCl and 1N KOH solutions between the Luggin tips was determined in separate measurements, averaged, and subtracted from the voltage drop measured with the bipolar membrane in position. The voltage drop across the bipolar membrane was then measured at various current densities, e.g. 1.8–165 $ma/cm^2$ (1.7–154 $A/ft^2$) and the results are shown in Table V. Since about 0.75 volts are required to split water, voltages in excess of this value are due to the resistance of the bipolar membrane itself. In addition, at no current flow the voltage drop, Eo, across the bipolar membrane is generally about 0.75–0.80 volts.

The final single film bipolar membrane had a potential drop across it of 1.07 at 109 $ma/cm^2$ (DC when measured in an electrodialysis cell with 1N KOH and 1N HCl next to its anionic and cationic permeable sides, respectively. Its potential drop at zero current flow (Eo) was 0.81 volts, indicative of the fact that it is bipolar and functions as a water-splitter. When the bipolar membrane was placed in an electrodialysis cell with 10% acid and 10% base on opposite sides of the membrane at 163 $ma/cm^2$ (DC), it was found to have a base current efficiency of 74% and an acid current efficiency of 83% and in the acid at only 0.5%, i.e. sa = 0.5%. This membrane was run continuously for 66 days as a water-splitter at 77–91 $ma/cm^2$ (DC) at 30° C. of $NaHSO_3$ solution (9%) with no loss in its performance characteristics and only a modest increase in its potential drop.

TABLE V

The Preparation & Potential Drops for High Performance & Reproducible Single Film Bipolar Membranes

| Example No. | Film Composition matrix film | % polystyrene | % divinyl benzene | Preswelling Agent | Time | Chloro-Sulfonation (hrs.) | Quaternization Agent | % Cationic Layer | Voltage Drop Eo | Em |
|---|---|---|---|---|---|---|---|---|---|---|
| 1 | 10 mil UHMW-PE | 43.2 | 10.0 | $ClCH_2CH_2Cl$ | 16.0 | 320 | $Me_3N$ | 91 | 0.77 | 1.16 |
| 14 | 10.5 mil UHMW-PE | 43.0 | 10.0 | $CCl_4$ | 16.0 | 310 | $Me_3N$ | 56 | 0.77 | 1.13 |
| 15 | 10 mil UHMW-PE | 46.0 | 7.5 | $CCl_4$ | 18.0 | 285 | $Me_3N$ | 90 | 0.78 | 1.18 |
| 16 | 10 mil UHMW-PE | 36.2 | 7.5 | $CCl_4$ | 18.0 | 295 | $Me_3N$ | 83 | 0.78 | 1.14 |
| 17 | 10 mil UHMW-PE | 39.0 | 7.5 | $CCl_4$ | 17.0 | 290 | $Me_3N$ | 85 | 0.77 | 1.10 |
| 18 | 11 mil UHMW-PE | 38.0 | 7.5 | $CCl_4$ | 16.0 | 290 | $Me_3N$ | 81 | 0.77 | 1.10 |
| 19 | 10 mil UHMW-PE | 38.9 | 7.5 | $CCl_4$ | 16.0 | 290 | $Me_3N$ | 85 | 0.79 | 1.10 |
| 20 | 10 mil UHMW-PE | 38.2 | 7.5 | $CCl_4$ | 16.0 | 290 | $Me_3N^3$ | 91 | 0.77 | 1.16 |
| 21 | 10 mil UHMW-PE | 35.7 | 7.5 | $CCl_4$ | 16.0 | 290 | $Me_3N^3$ | 56 | 0.77 | 1.13 |
| 22 | 10 mil UHMW-PE | 43.0 | 7.5 | $CCl_4$ | 16.0 | 290 | TXMDA-$Me_3N^3$ | 90 | 0.78 | 1.18 |
| 23 | 10 mil UHMW-PE | 40.0 | 7.5 | $CCl_4$ | 18.0 | 295 | $Me_3N^3$ | 83 | 0.78 | 1.14 |
| 24 | 10 mil UHMW-PE | 46.7 | 7.0 | $CCl_4$ | 17.0 | 310 | $Me_3N^3$ | 85 | 0.77 | 1.10 |
| 25 | 10 mil UHMW-PE | 36.0 | 15 | $ClCH_2CH_2Cl$ | 16.0 | 330 | TXMDA-$^3$ $Me_3N$ | 81 | 0.71 | 1.21 |
| 26 | 10 mil UHMW-PE | 43.3 | 7.5 | $CCl_4$ | | 280 | TMPDA-$^3$ $Me_3N$ | 85 | 0.79 | 1.45 |

[1]TXMDA- is tetramethylxylylenediamine
[2]TMPDA- is tetramethylpropyldiamine
[3]These anionic functional groups were introduced following a second preswelling (after introduction of the cationic functional group had been added) to introduce chloromethyl groups using identical swelling agents and preswelling times as those shown under the preswelling column.

EXAMPLE 27

The following general procedures are employed to prepare a series of heterogeneous bipolar membranes; parts are by weight. A 5 mil high density polyethylene film 8 × 12 inches was supported in a stainless steel trough containing the aromatic vinyl monomer mixture of 90.5 parts of monostyrene, 9 parts divinylbenzene and 0.5 parts of benzoyl peroxide. The temperature of the mixture is maintained at 75° C. for 30 minutes. Following the styrenation, the film is removed from the bath, excess styrene removed from its surface, and the film is then placed between glass plates and polymerized in saturated sodium sulfate solution at 70° C. for 16 hours. The dried film contained 32% of total aromatics after two styrenation runs.

Two 4 × 4 inch portions of the film were cut from the original styrenated sheet and pre-swelled to equilibrium stage in the carbon tetrachloride solvent for 18 hours to prepare the film portions for the subsequent functionalization reaction.

One piece of the pre-swollen film was treated with 65% of chlorosulfonic acid in carbon tetrachloride for 2.5 hours, and hydrolyzed with dilute (0.2N) sulfuric acid for 24 hours at 45° C., then rinsed with distilled water until free of excess electrolyte to produce a cationic membrane.

The other piece of the pre-swollen film was treated with chloromethylmethylether catalyzed by 0.1% tin tetrachloride for 2 hours at refluxing condition. Afterwards, the film was treated with trimethylamine in acetone for 24 hours, then rinsed and dried to yield an anionic membrane.

The resulting anion and cation films are then dried in air at room temperature for 24 hours. The anion film is placed on a stainless steel plate. The cation film is placed over the anion film and covered by a second sheet of stainless steel plate; care must be taken to avoid wrinkles or creases. The sandwich is heated in a press at 180° C. and 500 lbs/in² for 30 minutes. The resulting high performance bipolar membrane has an Eo of 0.80 volts and 1.75 voltage at 1.20 amp. The physical appearance of the membrane is excellent and with current efficiency of 0.84.

EXAMPLE 28

The bipolar membrane is prepared as in example 27, but with 5 mil low density polyethylene. Only a single styrenation is required to yield a total aromatic content over 30%. The resulting membrane has Eo of 0.78V and Em at 1.20 amp of 1.85V; physical strength is excellent.

EXAMPLE 29

The following general procedures are employed to prepare a series of single film bipolar membranes by bonding two kinds of materials into a single film. One 7 mil high density polyethylene film (a high crystalline, dense material) was put on a stainless steel plate, then a film of 3 mil polypropylene film (a low crystalline, porous material) was placed over the polyethylene film and covered by a second stainless steel plate. The sandwich is heated in a press at 150° C. and 500 lbs/in² for 5 minutes, the resulting single film is free of folds and creases.

The resulting single film was supported in a stainless steel trough containing the aromatic vinyl monomer mixture of 85.5 parts by weight of monostyrene, 14 parts divinylbenzene and 0.5 parts of benzoyl peroxide. The temperature of the mixture is maintained at 75° C. for 30 minutes. Following the styrenation, the film is removed from the bath, excess styrene removed from its surface, and it is then placed between glass plates and polymerized in saturated sodium sulfate solution at 70° C. for 16 hours. The styrenation resulted in 28% total aromatic pick-up and it was determined the polyethylene portion of the bonded lamina has 35% of the aromatic while the polypropylene portion has 65% aromatic.

Prior to sulfonation, the cross-linked film is preswollen in a solvent, inert to, but at least partially miscible with the sulfonating agent or mixture for about 24 hours. Chlorosulfonations may be run at room temperature with chlorosulfonic acid-solvent mixtures ranging from about 10% to about 100% chlorosulfonic acid. The preswelling organic solvents such as carbon tetrachloride, dichloroethane are commonly used. The preswelling time has significant effect on the rate of chlorosulfonation and subsequently, on the depth of the cationic section of the resulting bipolar membrane and the location of the interface between the anionic and cationic sections. After pre-swelling, the chlorosulfonation (using 65% chlorosulfonic acid in carbon tetrachloride) is started from the polyethylene side of the film; and functionalization progresses through the film toward the polypropylene section. The progress of functionalization can be controlled and may be followed by microscopic examination of stained (methylene blue), microtomed, cross-sections.

Once the partially chlorosulfonated film is hydrolyzed with dilute (1N) sulfuric acid, neutralized with a 0.1N KOH and 5% KCl mixture, rinsed free of excess electrolyte with distilled water, and dried, it is then ready for chloromethylation. In lieu of drying, the film may be treated with several portions of solvent such as carbon tetrachloride. The chloromethylation is conducted by immersing the films into chloromethylmethylether containing 2.5% by weight, $SnCl_4$, and refluxing (59° C.) for about 6 hours under nitrogen. The film is then removed and quaternized in a 25% solution of trimethylamine in acetone at 25° C., for about 20 hours. The single film bipolar membrane so obtained is equilibrated in 1N potassium fluoride at 25° C. for 48 hours, with stirring. Microtomed thin sections may be stained with either a cationic dye (methylene blue) and/or an anionic dye (methyl orange), and have been observed to compliment each other, with a sharp interface between them.

The voltage drop across the bipolar membrane was then measured at various current densities, e.g. 1.8–165 ma/cm² (1.7–154 A/ft²). The potential drop at zero current flow (Eo) was 0.81 volts, which is indicative of the fact that it is bipolar and functions as a water-splitter. The voltage drop at 1.2 amp is 1.46 volts. The membrane has a base current efficiency of 68% and an acid current efficiency of 80%.

EXAMPLES 30 to 37

The following general procedures are employing preswelling for preparing a series of anion membranes, the results of which are summarized in Table III. In preparing the membranes from the polyethylene films, the films were supported in a trough containing the aromatic vinyl monomer mixture of the selected mole ratio of vinyl aromatic monomer and cross-linking agent, e.g. styrene/divinylbenzene/benzoyl peroxide (catalyst), and at the desired temperature. Immersion in the vinyl aromatic monomer, e.g. styrenation, is conducted for a time period necessary to attain sufficient impregnation of the film, which is dependent upon its thickness and morphology, as well as the styrenating temperature.

In impregnating the substrate film with the vinyl aromatic monomer, temperatures at or above which the film softens to an undesirable degree are to be avoided.

Generally for mixtures containing 5–15% DVB, styrenations were carried out at 70°–85° C. for time periods of about ¼ to 1 hour. Following styrenation, the film is removed from the bath, excess styrene removed from its surface, and it is then pressed between aluminum foil covered glass plates and polymerized at 70°–85° C. for 18–24 hours. In order to obtain styrene contents of about 40–60% the procedure may be repeated.

Prior to chloromethylation, it is necessary if a product of superior quality is to be obtained that the cross-linked film be preswollen in a solvent, inert to, but at least partially miscible with the chloromethylation agent or mixture for a suitable period of time, e.g. 24 hours. The solvent swells the film, making the aromatic nuclei more accessible for reaction; hence, the subsequent functionalization reaction rate is increased. By preswelling the films in carbon tetrachloride at 25° C. for 16 hours (or alternatively the preswelling may be effected at 60° C. for two hours), then the films were subjected to a chloromethylation reaction in a glass container refluxed with chloromethylmethylether catalyzed by tin tetrachloride for 2 hours to complete the reaction. If the identical films were treated without preswelling, the chloromethylation reaction was commpleted in 6 hours refluxing. The properties of the anion membrane of both with and without preswelling are shown in Table VI, the resulting membranes which are preswollen have lower electrical resistance and higher current efficiency. In use, they are found to concentrate HF (or other processed streams) to much higher concentration.

Various modification may be made in the invention by those skilled in the art without departing from the inventive contribution as set forth in the claims below.

TABLE VI

High Performance Anionic Membranes Obtained From Preswelling Treatment

| Example No. | Material | Thickness (mil) | % Styrene | % DVB | Pre-Swelling | Amine Type | R in 1.0NKF (ohm-cm$^2$) | in 12% HF | HCL (0.1 1.0) | HF Conc. Dil. | HF Conc. Conc. |
|---|---|---|---|---|---|---|---|---|---|---|---|
| 30 | HDPE | 5.0 | 34 | 30 | yes | Deta-Me,N | 2.5 | 2.0 | 0.67 | | |
| 31 | HDPE | 5.0 | 34 | 30 | no | Deta-Me,N | 6.1 | 6.8 | 0.75 | | |
| 32 | HDPE | 7.0 | 23 | 18 | yes | Me,N | 1.3 | 2.1 | 0.81 | 13.4 | 41.0 |
| 33 | HDPE | 9 | 28 | 10 | yes | Deta-Me,N | 2.0 | 1.8 | 0.90 | 13.0 | 42.9 |
| 34 | HDPE | 9 | 28 | 10 | no | Deta-Me,N | 8.7 | 7.8 | | | |
| 35 | HDPE | 12 | 32 | 8 | yes | Me,N | 1.8 | 2.1 | 0.85 | 13.2 | 41.6 |
| 36 | HDPE | 5 | 35 | 5 | yes | Deta-Me,N | | 1.2 | 0.80 | 14.0 | 38.2 |
| 37 | HDPE | 5 | 35 | 5 | no | Deta-Me,N | 11.2 | 6.9 | | | |

What is claimed is:

1. A durable, high performance membrane carrying charged group comprising a matrix of polyolefin base film uniformly impregnated with a mixture of at least 15 percent by weight, based on the total weight of the membrane, of a cross-linked monovinyl aromatic monomer which is thereafter polymerized and cross-linked with the equivalent of 5–30 percent divinylbenzene based on weight of the mixture of the vinyl aromatic monomer, containing, on the aromatic nuclei of the matrix, chemically bonded electrically charged groups, said charged groups being introduced after the cross-linked matrix has been preswollen with a solvent which is substantially inert and miscible with the functionalization agent which supplied said charged groups.

2. The membrane of claim 1 wherein the charged groups are cationic.

3. The membrane of claim 1 wherein the charged groups are anionic.

4. The membrane of claim 1 wherein the polyolefin base film is polyethylene.

5. The membrane of claim 1 wherein the polyolefin base film is polypropylene.

6. The membrane of claim 1 wherein the polyolefin base film is an ethylene propylene copolymer.

7. The membrane of claim 1 wherein the polyolefin base film is polytrifluorochloroethylene.

* * * * *